UNITED STATES PATENT OFFICE.

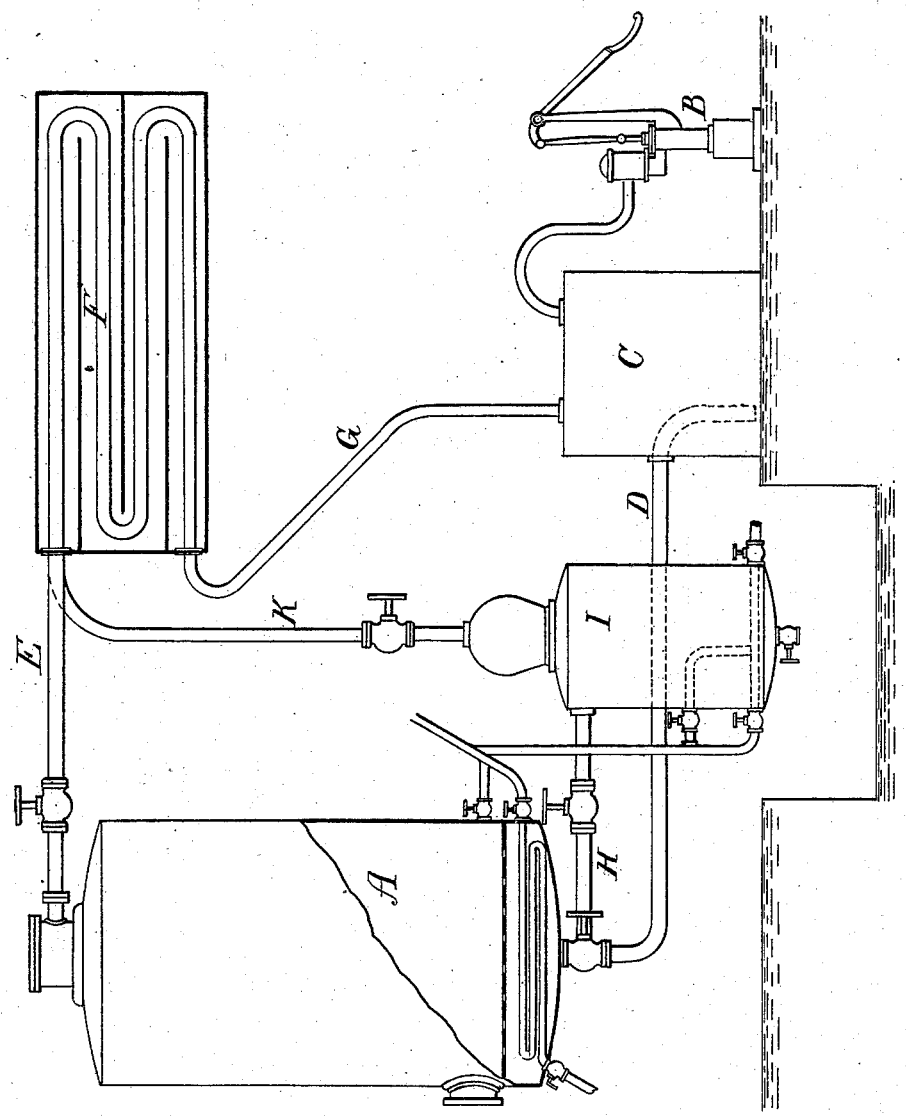

FRIEDRICH SELTSAM, OF FORCHHEIM, GERMANY.

APPARATUS FOR SEPARATING AND RECOVERING THE FATTY MATTERS FROM BONES.

SPECIFICATION forming part of Letters Patent No. 242,702, dated June 7, 1881.

Application filed February 17, 1881. (No model.) Patented in Germany December 7, 1879, in Belgium May 18, 1880, in France May 19, 1880, and in England July 29, 1880.

*To all whom it may concern:*

Be it known that I, FRIEDRICH SELTSAM, of Forchheim, in the Empire of Germany, have invented a new and useful Improvement in Apparatus for Separating and Recovering the Fatty Matters from Bones, of which the following is a specification.

This invention relates to improvements in the apparatus for extracting the fat from bones by the use of the vapors of sulphuret of carbon, benzine, and the like substances under pressure.

I will proceed to describe the invention by reference to the accompanying drawing, which represents a side elevation of my improved apparatus.

A is an air-tight chamber, constructed to withstand a pressure of ten atmospheres, and serving as a vapor-generator and extracting-chamber, which, at the commencement of the operation, is filled with bones up to the valve in a pipe, E, and is then closed air-tight.

B is a pump, which forces the necessary quantity of solvent liquid from a reservoir, C, through a pipe, D, into the extracting-chamber A. The vapors produced force out the air through the pipe E into a condenser, F, where all solvent in the form of vapor passing in with the air is condensed, and passes back through a pipe, G, into the reservoir C, and when the air has passed from the chamber A and from the bones the said pipe E is closed. The contents of the extracting-chamber A are now heated by means of a suitable steam-heating apparatus to a sufficient degree as will produce a pressure of several atmospheres, such pressure being maintained until the fat is melted out of the bones under treatment, such fat running down and collecting at the bottom of the apparatus. The fat being thus extracted, the valve in the pipe H is opened, and the superheated liquid is allowed to flow under high pressure into the distilling apparatus I, and the solvent is distilled from the fat by suitable means—such as by steam-heating—and the vapors of the solvent pass through a pipe, K, into the condenser F, whence they pass in the form of vapor into the reservoir C, to be again used; and as soon as the gage on the chamber A indicates that the pressure has ceased, the valve in the pipe H is again closed, the apparatus is reheated, by which means any solvent which may still remain in the bones passes out through the open valve in the pipe E.

I claim as my invention—

1. The combination of the chamber A, valved pipe E, and condenser F with reservoir C, pipe G, pump B, and valved pipe D.

2. The combination of the chamber A, valved pipe H, and still I with pipe K, condenser F, pipe G, and reservoir C, in connection with said chamber A.

In testimony whereof I have signed my name to this specification in the presence of two subscribing witnesses.

FRIEDRICH SELTSAM.

Witnesses:
JOSEPH SILLER,
ALFRED MUSSINAN.